Patented Oct. 29, 1929

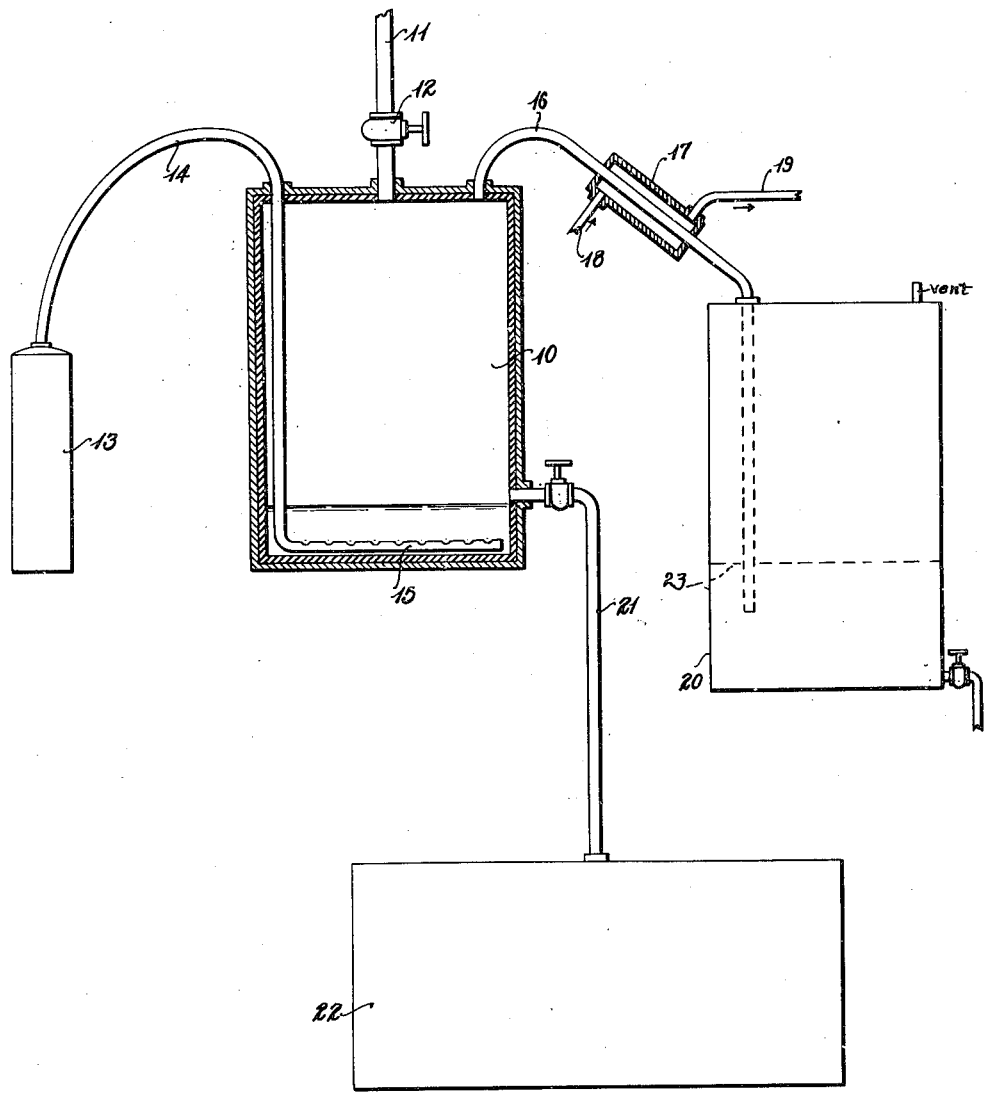

1,733,843

UNITED STATES PATENT OFFICE

FERNANDO SOMOZA VIVAS, OF LOS ANGELES, CALIFORNIA, ASSIGNOR TO INTERNATIONAL FIREPROOF PRODUCTS CORPORATION, OF NEW YORK, N. Y., A CORPORATION OF DELAWARE

NONCOMBUSTIBLE CHLORINATED HYDROCARBON AND PROCESS OF PRODUCING THE SAME

Application filed March 11, 1927. Serial No. 174,642.

The invention relates to non-combustible material comprising a hydrocarbon united with chlorine useful as a cleaner or solvent.

It is an object of the invention to prepare commercial gasoline for treatment and to then treat the prepared gasoline so as to replace certain of the hydrogen atoms of hydrocarbon with chlorine.

It is a further object of the invention to produce a non-combustible substance of the character described of use as a cleaner, which may be used instead of turpentine as a solvent in the preparation of paints, varnishes and the like.

Further objects of the invention will appear from the following description when read in connection with the accompanying drawing in which the figure is a diagrammatic representation of apparatus for carrying out the process of the invention.

Commercial gasoline as supplied to the trade is found to comprise hydrocarbon of which a representative formula is $C_6H_{14}$ in combination with a variety of heavy hydrocarbons in the nature of lubricating oils. In attempts to treat gasolines for the present purpose as heretofore known the difficulty has been found that the treatment has failed in the case of some of the gasolines upon the market because of the variation in the heavy oils contained therein.

According to the present invention the commercial gasoline is first thoroughly agitated with a solution of sodium hydroxide which has the result of saponifying the heavy oils which saponified material settles to the bottom of the receptacle from which the purified gasoline may be decanted or drawn off.

The thus treated gasoline is introduced into a receptacle such as indicated at 10 in the drawing as by a pipe 11 and the receptacle may then be closed as by means of valve 12.

Before closure of the receptacle, there is introduced into the same per one hundred gallons of purified gasoline, five gallons of perchlormethane, one gallon of aqua ammonia, and ten pounds of either aluminum or ferric chloride.

The mixture of the last named substances being heavier than the gasoline will settle to the bottom of the receptacle. When the receptacle has been thus charged, chlorine gas is led thereinto as from a gas retort 13 through pipe 14 dipping to the bottom of the receptacle and discharging through jets from a pipe 15 to cause the gas to bubble upwardly through the heavy material and through the gasoline with consequent agitation of the materials.

In the presence of the perchlormethane, ammonia and chloride acting as a catalyst, certain of the hydrogen atoms of the hydrocarbon will be displaced by chlorine atoms, said hydrogen atoms then combining with other chlorine atoms to form hydrochloric acid with production of heat as a result of the chemical action and the hydrochloric acid will escape in a gaseous condition.

The gaseous hydrochloric acid is led from the receptacle 10 as through a pipe 16 and is passed through a condenser 17 through which a cooling agent is led about the pipe 16 as by means of pipes 18, 19. The thus cooled gaseous hydrochloric acid is then collected in a receptacle 20, by bubbling through water 23. The reaction is carried on until the specific gravity of the material under treatment reaches a point of substantially 1.32. The treated material is then led from the receptacle 10 through a lead pipe 21 to a receptacle 22.

To neutralize the reaction of the treated material, the material in the receptacle 22 or in any convenient manner is again washed with sodium hydroxide after which the material is ready for use.

Receptacle 10 is preferably a lead lined chamber and the same material is desirably used for pipe 16 and receptacle 20.

The material thus provided is found to be a very valuable cleaning agent for clothes or fabrics and will dissolve greases of all character, paint and the like without injury to the color of the fabric, its effect upon the color being that of a mordant. Using a gasoline having a representative formula such as $C_6H_{14}$, the representative formula of the product is found to be $C_6H_7Cl_7$.

Also the material is found to be absolutely non-inflammable and non-explosive.

Because of its solvent qualities, the material may also be used in place of turpentine in preparation of paints and varnishes since it readily vaporizes and is an excellent solvent for the material of which paints and varnishes are manufactured.

The heavy ends removed from the gasoline by the first treatment with caustic alkali are recovered and utilized for lubricating purposes and may be used in their saponified condition.

Minor changes may be made in the steps of the process or quantities of the material used within the scope of the appended claims without departing from the spirit of the invention.

I claim:

1. The method of chlorinating gasoline which comprises treating the gasoline to remove heavy ends, bubbling chlorine gas through the thus treated gasoline in the presence of perchlormethane, ammonia and a metallic chloride.

2. The method of chlorinating gasoline which comprises removing heavy ends from the gasoline by treatment with a solution of caustic alkaline metal hydroxide, bubbling chlorine gas through the purified gasoline in the presence of perchlormethane, aqua ammonia and ferric chloride, and neutralizing the reaction of the thus chlorinated product by treatment with a solution of an alkaline metal hydroxide.

3. The method of preparing a lubricant and a chlorinated hydrocarbon which comprises treating commercial gasoline with a solution of caustic alkaline-metal hydroxide to remove the heavy ends, recovering the heavy ends in saponified condition for use as a lubricant, bubbling chlorine gas through the thus treated gasoline in the presence of perchlormethane, ammonia and a metallic chloride.

4. A mixture of chlorinated hydrocarbons having representative formulæ such as $C_6H_7Cl_7$ with a neutral reaction.

In testimony whereof I affix my signature.

FERNANDO SOMOZA VIVAS.